3,467,493
METHOD FOR REMOVAL OF IMPURITIES IN RARE GASES

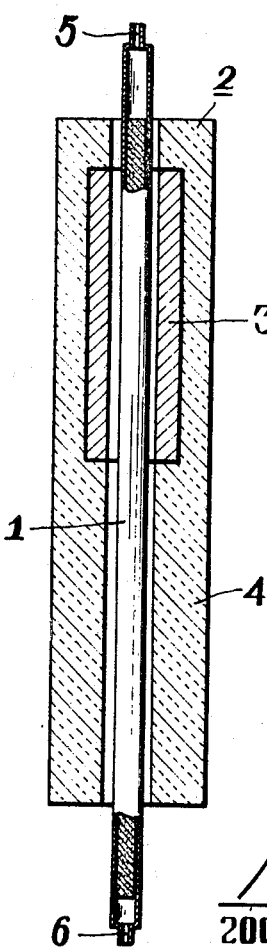
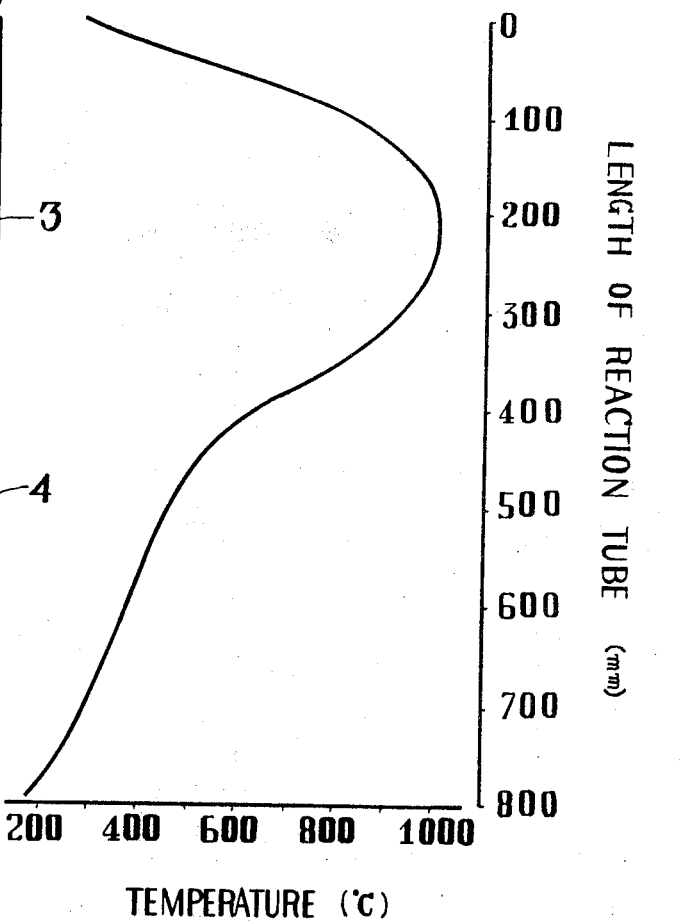

Takashi Eguchi, Chigasaki-shi, Shinichi Iwabuchi, Tokyo and Takao Akiyama, Yokohama, Japan, assignors to Japan Pure Hydrogen Company Ltd., Tokyo, Japan
Filed May 23, 1967, Ser. No. 640,716
Claims priority, application Japan, June 7, 1966, 41/36,755
Int. Cl. B01d 53/02, 53/00; C01b 23/00
U.S. Cl. 23—2                                              5 Claims

ABSTRACT OF THE DISCLOSURE

Impurities are removed from a rare gas by passing it through a single reaction zone charged with a gettering agent, the temperature in the zone decreasing gradually and stage by stage from 1050° C. to 350° C. in the direction of flow of the rare gas.

---

This invention relates to a method of removing the impurities, oxygen, nitrogen, hydrogen and moisture, present in rare gases, such as argon and helium, thereby obtaining rare gases of a high purity.

Background of the invention

D. S. Gibbs et al., Industrial and Engineering Chemistry, vol. 48, No. 2, pages 289–296, 1956, treat argon containing 3.9% nitrogen and 0.55% oxygen to reduce these impurities to 3.41% and 0.00%, respectively, in a cylinder charged with titanium and heated by an electric furnace to 600–1000° C. But the removal of nitrogen is incomplete and, moreover, no reference is made to the removal of moisture and hydrogen.

In L. G. Carpenter et al., Metallurgia, December 1948, pages 63–65, a method of purifying argon by passing raw argon through heated titanium to remove the impurities, oxygen and nitrogen, at 700° C. and 1000° C., respectively, is described, but this method is qualitative.

In German Patent No. 945,751, the hydrogen in argon is removed by a palladium catalyst at 400–500° C., but there is no description as to the removal of oxygen, nitrogen and moisture.

According to M. W. Mallett, in Industrial Engineering Chemistry, vol. 42, No. 10, pages 2095–2096, 1950, a test was made by passing raw argon containing 980 p.p.m. of nitrogen and 10 p.p.m. of oxygen through a tube charged with spongy titanium and heated to 850° C. to remove these impurities but it was impossible to remove hydrogen and moisture.

In U.S. Patent No. 3,061,403, raw argon containing 15 p.p.m. of nitrogen, 37 p.p.m. of oxygen and 25 p.p.m. of moisture is passed through a reaction tube charged with titanium and heated to 815–875° C. to obtain an argon purified to a total impurity content of 2 p.p.m. In this case, however, in order to remove the impurities, nitrogen, oxygen, moisture and hydrogen, a reaction tube charged with titanium is used for each of the impurities.

According to U.S. Patent No. 3,141,739, hydrogen and oxygen in raw helium are converted to water, and the carbon monoxide to carbon dioxide gas, at 150° C. by using a platinum catalyst on a molecular sieve, then the raw helium is passed through a metallic calcium layer to remove the remaining impurities, and, further, the extremely small amounts of impurities are removed by a cold trap of uranium plate inserted in each purification stage. This method, however, is very complicated for use in industry.

Also, there are the methods of U.S. Patent No. 3,097,940 and U.S. Patent No. 3,061,403, both of which remove the impurities by carrying out a very complicated operation in several stages and are, therefore, inconvenient.

Summary of the invention

The object of this invention is to provide a novel method of removing the impurities from rare gases, which is free from the defects inherent in conventional methods.

This object is achieved with a reaction tube charged with spongy titanium and heated stage-by-stage to gradually decreased temperatures ranging from 1050° C. to 350° C. in the flow direction of raw rare gas so as to complete the reaction of titanium with each of the impurities, nitrogen, oxygen, moisture and hydrogen, in said gas at said respective temperatures, thereby removing these impurities.

Because of the gradually decreased temperatures over the full length of the reaction tube from the inlet to the outlet thereof, the impurities, nitrogen, oxygen, moisture and hydrogen, in the raw rare gas are heated to, and completely reacted with, titanium at the respective optimum reaction temperatures.

The optimum reaction temperature of titanium with the respective impurities, nitrogen, oxygen, moisture and hydrogen, in raw rare gas are as follows:

Reaction Formula—
$Ti + N_2 \rightarrow TiN$: 800–1050° C. _____ 1
$Ti + O_2 \rightarrow TiO$, $TiO_2$ or $Ti_2O_3$: 700–1050° C. _____ 2
$Ti + H_2O \rightarrow TiO + H_2$: 700–1050° C. _____ 3
$Ti + H_2 \rightarrow TiH_2$: 350–500° C. _____ 4

The optimum temperature, 350–500° C., in the hydrogen-absorbing reaction stage of titanium shown in Formula 4 is the lowest. Above 500° C., the titanium absorbs no hydrogen, while, to the contrary, $TiH_2$ is decomposed into titanium and hydrogen, so that the removal of hydrogen through absorption by titanium is incomplete at such high temperatures. On the other hand, below 350° C., the hydrogen absorption by titanium tends to be reduced. It follows, therefore, that the temperature range of 350–500° C. is most suitable for removal of the impurity hydrogen in raw rare gas. Accordingly, for the removal of hydrogen through absorption by spongy titanium, a zone heated to 350–500° C. is required. Also, since hydrogen as an impurity is generated by the moisture in rare gas being decomposed by titanium, it is necessary that the reaction proceed from $Ti + H_2O$ to $TiO + H_2$, as shown in Formula 3, so as to decompose the moisture completely. This reaction begins at about 700° C., but, if the spongy titanium is continuously heated at a temperature above 1050° C., it gets gradually sintered and changes from spongy form to massive form to reduce the surface area strikingly, and, accordingly, the moisture-decomposing reaction of titanium and the reaction of titanium with other impurities are strikingly reduced, making the removal of impurities very incomplete. Therefore, the temperature most suitable for decomposition by titanium of the moisture is in the range of 700–1050° C.

Next, the reaction of titanium with nitrogen shown in Formula 1 is an irreversible reaction. TiN is a stable compound, so, for forming a nitride by heating titanium, it is desirable that the temperature be high, i.e. in the range from about 800 to 1050° C. At a temperature below 800° C., the reaction of titanium with nitrogen hardly occurs, so the object of removing the nitrogen cannot be achieved. Incidentally, the reaction of titanium with oxygen shown in Formula 2 forms an oxide such as $TiO$, $TiO_2$ or $Ti_2O_3$ which, at around 1000° C., is stable without being decomposed into titanium and oxygen.

By compressing raw rare gas to raise the concentration of the impurities contained therein, it is possible to speed up the reaction of titanium with the impurities. When the concentration of raw rare gas becomes gradually low as the impurities therein react with titanium, the reaction slows down. Therefore, it is preferred to compress the raw rare gas and, under pressure, allow the impurities, oxygen, nitrogen, moisture and hydrogen, in the gas to react with heated spongy titanium, thereby removing them more quickly. If raw rare gas is compressed under a pressure of 10 atmospheres, the impurity concentration is raised 10 times, and if the gas is compressed under a pressure of 100 atmospheres, the impurity concentration is raised 100 times, so, naturally, the efficiency of impurity removal by titanium becomes very high.

Brief description of drawing

Other features of this invention will become more apparent from the following description and examples of this invention, particularly if read in conjunction with the accompanying drawing, wherein:

FIGURE 1a is a longitudinal sectional view of an apparatus for carrying out the method of this invention; and FIGURE 1b is a graph showing the temperature distribution in the reaction tube illustrated in FIG. 1a.

Detailed description

Referring to FIG. 1a, a reaction tube 1 charged with spongy titanium is inserted in an electric furnace 2 and heated to 700–1050° C. in the heating zone 3 of said electric furnace 2. In the heat-retaining zone 4 of the electric furnace 2, the reaction tube 1 is kept heated to 500–350° C. The temperature distribution in the reaction tube 1 is as shown in FIG. 1b. Raw rare gas is introduced into inlet 5 under pressure, then passed through the spongy titanium to remove the impurities, thereby purified and thereafter discharged from an outlet 6.

The nitrogen and oxygen in the rare gas react with the titanium in the 800–1050° C. and 700–1050° C. zones, respectively. On the other hand, the moisture begins to be decomposed into hydrogen and oxygen at about 700° C., at which temperature the oxygen immediately reacts with the titanium, whereas the hydrogen, because of its reaction temperature with titanium being 350–500° C., does not react with the titanium, but passes together with the raw rare gas through the heating zone 3 into the heat-retaining zone 4, wherein, because the spongy titanium is kept heated to 350–500° C., the hydrogen begins to react with the titanium. Since the temperature of the reaction tube 1 is gradually reduced towards the outlet 6, no reversible reaction between Ti and $H_2$ will occur; thus, purified rare gas will be discharged from outlet 6.

Preferred examples of this invention are given hereunder.

A quartz reaction tube having an inner diameter of 20 mm. and a length of 800 mm. was charged with spongy titanium of 8–20 mesh, and the tube was inserted in an electric furnace. The electric furnace was then adjusted so as to keep the reaction tube heated stagewise to gradually decreased temperatures ranging from 1050° C. to 700° C. over the length of about 300 mm. and from 500° C. to 350° C. over the length of about 200 mm. in the flow direction of raw rare gas, as shown in FIG. 1b.

Raw rare gases, argon and helium, were respectively purified in the above-mentioned reaction tube at varied spaced velocities (S.V.) in the range of 2000–6000/hr. The results obtained were good, as shown in Table 1 and Table 2.

Incidentally, the impurities were analyzed, the nitrogen by the Kjeldahl method of nitrogen determination, the oxygen by a method of luminous reaction of yellow phosphorus, the hydrogen by an ionization detector, and the moisture by a dew point meter capable of measuring up to −120° C., respectively.

TABLE 1.—PURIFICATION OF ARGON BY USE OF TITANIUM

[Values of impurities in raw argon]

|  | $N_2$ (p.p.m.) | $O_2$ (p.p.m.) | $H_2$ (p.p.m.) | $H_2O$ (p.p.m.) | Dew point (°C.) |
|---|---|---|---|---|---|
| Sample No. |  |  |  |  |  |
| 1 | 72.5 | 0.3> | 1> | 17 | −61.5 |
| 2 | 3.8 | 0.2 | 1> | 17 | −61.5 |
| 3 | 2.8 | 0.3 | 1> | 15 | −61.0 |
| 4 | 2.2 | 0.3 | 1> | 15 | −61.0 |
| [Purity of argon purified] |  |  |  |  |  |
| 1, S.V.: 6,000 | 0.000 | 0.0> | (¹) | 0.00> | −100.0 |
| 2, S.V.: 2,000 | 0.000 | 0.0> | (¹) | 0.00> | −100.0 |
| 3, S.V.: 3,000 | 0.001 | 0.0> | (¹) | 0.00> | −100.0 |
| 4, S.V.: 4,000 | 0.0005 | 0.0> | (¹) | 0.00> | −100.0 |

¹ Not detected.

TABLE 2.—PURIFICATION OF HELIUM BY USE OF TITANIUM

[Values of impurities in raw helium: (Canadian helium)]

|  | $N_2$ (p.p.m.) | $O_2$ (p.p.m.) | $H_2$ (p.p.m.) | $H_2O$ (p.p.m.) | Dew point (°C.) |
|---|---|---|---|---|---|
|  | 9.8 | 2.1 | 4±2 | 3.0 | −72.0 |
| [Purity of helium purified] |  |  |  |  |  |
| S.V.: 4,000 | 0.0048 | 0.0> | (¹) | 0.00> | −100.0 |

¹ Not detected.

In the purification of argon containing nitrogen 72.5 p.p.m., oxygen 0.3 p.p.m. and hydrogen 0.1 p.p.m. as impurities and having a dew point of −61° C. effected at 1000° C. at a space velocity of 8000/hr., when the argon was purified in an amount of 1600 l. relative to 10 g. of the charged titanium (titanium having a surface area of 100 cm.²/g. based on the BET-method), the amount of nitrogen in the purified argon was 0.00 p.p.m.; when 3200 l. was purified, the amount of nitrogen increased to 1.93 p.p.m. and, when 4000 l. was purified, to 2.41 p.p.m. Accordingly, the amount of titanium suitable for obtaining a purified argon containing nitrogen 0.00 p.p.m. was 10 g. per 1600 l.

Further, in this invention, in place of titanium, tantalum, niobium, zirconium, or hafnium may be used in the same way as in the case of spongy titanium to obtain the same purification effect in respect of rare gases.

What is claimed is:

1. A method of removing at least two impurities selected from the group consisting of nitrogen, oxygen, hydrogen and water vapor from a rare gas, comprising the steps of passing the impurities and rare gas through a single inlet into a reaction zone charged with titanium, tantalum, niobium, zirconium or hafnium, removing the pure rare gas from an outlet of said zone, and gradually decreasing the temperature in said zone stage by stage from the inlet to the outlet from 1050° C. to 350° C. and thereby reacting said impurities.

2. The method of claim 1, wherein the gas is under atmospheric pressure in the reaction zone.

3. The method of claim 1, wherein the reaction zone is charged with spongy titanium.

4. The method of claim 1, wherein the gas is under super-atmospheric pressure in the reaction zone.

5. The method of claim 4, wherein the super-atmospheric pressure is between 10 and 100 atmospheres.

References Cited

FOREIGN PATENTS 961,925   6/1964   Great Britain.

REUBEN FRIEDMAN, Primary Examiner

CHARLES N. HART, Assistant Examiner

23—209; 55—25, 66